3,183,157
ANTIBIOTIC NOGALAMYCIN AND METHOD
OF PRODUCING
Bijoy K. Bhuyan, Kalamazoo, Ronald B. Kelly, Cooper Township, Kalamazoo County, and Robert M. Smith, Portage Township, Kalamazoo County, Mich., assignors to The Upjohn Company, Kalamazoo, Mich., a corporation of Delaware
Filed Feb. 1, 1963, Ser. No. 255,536
7 Claims. (Cl. 167—65)

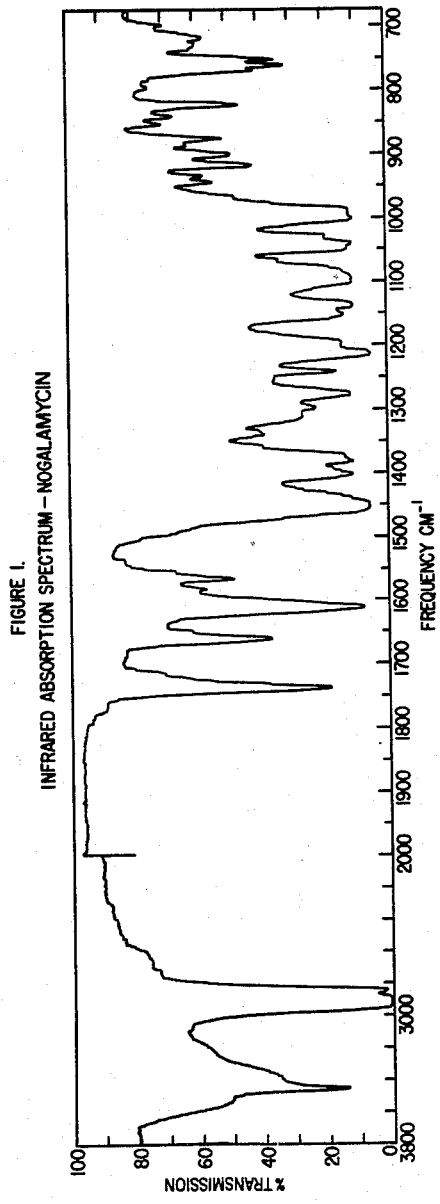

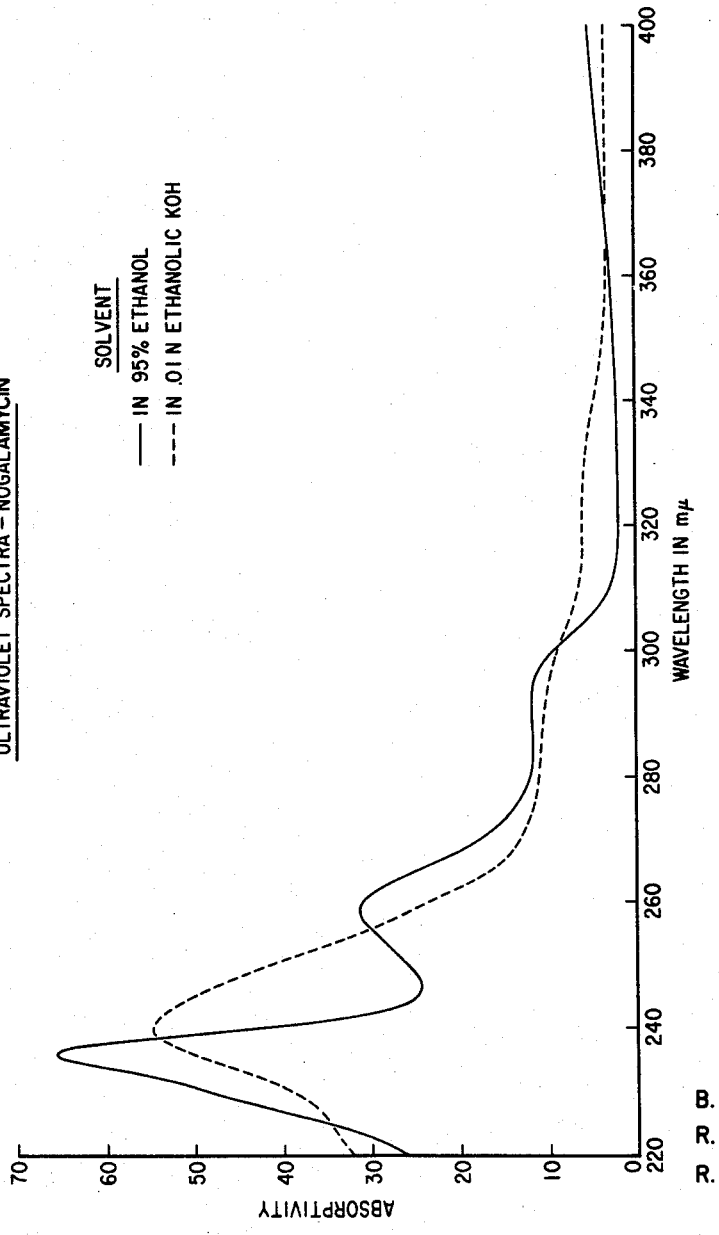

This invention relates to a novel composition of matter and to a process for the production thereof. More particularly, this invention relates to a new compound, Nogalamycin, and to a process for the production thereof.

Nogalamycin is a biosynthetic product obtained as an elaboration product of a nogalamycin-producing actinomycete. It has the property of adversely affecting the growth of gram positive bacteria, for example, *Staphyloccus aureus, Streptococcus faecalis,* and *Bacillus subtilis.* It is also active against some gram negative bacteria, for example, *Klebsiella pneumoniae.* Accordingly, nogalamycin can be used alone or in combination with other antibacterial agents to prevent the growth of or reduce the number of such organisms present in various environments.

THE MICROORGANISM

The actinomycete used according to this invention has been designated as *Streptomyces nogalater* var. *nogalater.* One of its strain characteristics is the production of nogalamycin. A subculture of this variety can be obtained from the permanent collection of The Northern Utilization and Research Division, Agricultural Research Service, U.S. Department of Agriculture, Peoria, Illinois, U.S.A. Its accession number in this repository is NRRL 3035.

It is to be understood that the invention is not limited to the use of the particular organism described herein, but includes, inter alia, mutants produced from the described organism by mutating agents, for example, X-rays, ultraviolet radiation and nitrogen mustards. Macroscopic and microscopic observations on *Streptomyces nogalater* var. *nogalater* are given in the following tables:

Table I—Appearance on Ektachrome
Table II—Assimilation of carbon compounds in a synthetic medium
Table III—Cultural characteristics Table I.—*Appearance of S. nogalater var. nogalater on Ektachrome*

| Agar medium | Surface | Reverse |
|---|---|---|
| Bennett's | Gray | Bright orange-tan. |
| Czapek's sucrose | do | Gray. |
| Maltose tryptone | do | Bright orange-tan. |
| Peptone iron | Colorless | Tan. |
| 0.1% tyrosine | Gray | Gray. |
| Casein starch | do | Dull orange-tan. |

Table II.—*Assimilation of carbon compounds in synthetic medium of S. nogalater var. nogalater*

[J. Bact., 56, 107–114, 1948]

Control (−)
1. D-xylose +
2. L-arbinose +
3. Rhamnose +
4. D-fructose +
5. D-galactose +
6. D-glucose +
7. D-mannose +
8. Maltose +
9. Sucrose −
10. Lactose +
11. Cellobiose +
12. Raffinose (+)
13. Dextrin +
14. Inulin (−)
15. Soluble starch +
16. Glycerol +
17. Dulcitol (+)
18. D-mannitol +
19. D-sorbitol (+)
20. Inositol (+)
21. Salicin −
22. Phenol −
23. Cresol −
24. Na formate −
25. Na oxalate −
26. Na tartrate −
27. Na silicylate −
28. Na acetate +
29. Na citrate +
30. Na succinate (+)

\+ Positive assimilation.
− No growth.
(−) Slight growth—no assimilation.
(+) Positive assimilation—only slight growth.

*Color description.*—Colors of the culture, on Bennett's, Czapek's Sucrose, and Maltose Tryptone agars after 14 days incubation at 28° C., were matched with the chips in the Color Harmony Manual 3rd Ed., 1948. The color names were then redefined according to the ISCC–NBS Method of Designating Colors and a Dictionary of Color Names, N.B.S. Circular 553, 1955.

Color designations are as follows:

| Agar medium | Surface | Reverse | Pigment |
|---|---|---|---|
| Bennett's | Light yellowish pink; Pale yellowish pink. | Strong orange; Deep orange. | Deep orange. Brownish orange. |
| Czapek's sucrose. | Sand | Sand | Grayish pink; pale yellowish pink. |
| Maltose tryptone. | Pinkish white | Strong orange; deep orange. | Moderate orange. |

Table III.—*Cultural characteristics of S. nogalater var. nogalater*

| Medium | Surface | Reverse | Other |
|---|---|---|---|
| Peptone-iron agar | Peach to orange-tan | Orange to orange-tan | Yellow to orange-tan pigment; no $H_2S$ darkening. |
| Calcium malate agar | Gray-green | Gray-pink | Dark pink pigment; malate solubilized after 7 days. |
| Glucose-asparagine agar | Gray-white | Cream-yellow | Slight tan pigment. |
| Skim milk agar | Peach-white to white | Orange-tan | Orange-tan pigment; casein solubilized after 7 days. |
| Tyrosine agar | Peach to pink | Orange | Yellow to pink-orange pigment; tyrosine solubilized under growth. |
| Xanthine agar | do | Cream-orange | Yellow to pale pink pigment; xanthine solubilized under growth. |
| Casein starch agar | do | Tan-rose | Pale pink pigment. |
| Bennett's agar | Peach to pink-gray | Orange | Yellow to orange-tan pigment; good growth at 18°–37° C. |
| Czapek's sucrose agar | Peach to gray-white | Peach to gray-white | None to pale pink pigment; poor growth from 18°–37° C. |
| Maltose tryptone agar | Gray cream-white | Orange | Orange-tan pigment; good growth from 18°–37° C. |
| Nutrient nitrate broth | White | | Fuzzy vegetative growth at base orange-tan pigment; no reduction. |
| Synthetic nitrate broth | Colorless | | Vegetative growth throughout broth; no reduction. |
| Litmus milk | | | Dark rose-brown color; ¾ peptonized, pH 7.5. |
| Plain gelatin | Trace peach | | Top half tan-brown pigment; bottom half orange-tan pigment; liquefaction ⅓. |
| Nutrient gelatin | do | | Top half tan-brown pigment; bottom half orange-tan pigment; top half liquefied. |

*Streptomyces nogalater* var. *nogalater* NRRL 3055, is different from any described *Streptomyces* species. In addition to the characteristics given above, this microorganism, when viewed by the light microscope, has sporophores which appear straight to slightly coiled. The spores are smooth and spherical to elliptical when seen by direct examination under the electron microscope. Carbon replicas of the spores, as viewed by the electron microscope, reveal them to be more or less spherical and to have a smooth surface with slight ridging. The pores also seem to rupture quite easily.

A significant characteristic of the culture on most media is the production of an odor akin to that of black walnuts.

The new compound of the invention is produced when the elaborating organism is grown in an aqueous nutrient medium under submerged aerobic conditions. It is to be understood that for the preparation of limited amounts surface cultures in bottles can be employed. The organism is grown in a nutrient medium containing a carbon source, for example, an assimilable carbohydrate, and a nitrogen source, for example, an assimilable nitrogen compound or proteinaceous material. Preferred carbon sources include glucose, brown sugar, sucrose, glycerol, starch, corn starch, lactose, dextrin, molasses, and like carbohydrate sources. Preferred nitrogen sources include corn steep liquor, yeast, autolyzed Brewer's yeast with milk solids, pancreatic digestive casein, distiller's solubles, animal peptone liquors, meat and bone scraps, and like nitrogenous sources. Combination of these carbon and nitrogen sources can be used advantageously. Trace metals, for example, zinc, magnesium, manganese, cobalt, iron, and the like, need not be added to the fermentation media since tap water and unpurified ingredients are used as media components.

Production of the compound of the invention can be effected at any temperature conducive to the satisfactory growth of the microorganism, for example, between about 18° and 40° C. and preferably between about 26° and 30° C. Ordinarily, optimum production of the compound is obtained in from about 2 to 10 days. The medium normally stays fairly close to neutral, or on the alkaline side, during the fermentation. The final pH is dependent, in part, on the buffers present, and in part on the initial pH of the culture medium which is advantageously adjusted to about pH 6-8 prior to sterilization.

When growth is carried out in large vessels and tanks, it is preferable to use the vegetative form, rather than the spore form, of the microorganism for inoculation to avoid a pronounced lag in the production of the new compound and the attendant inefficient utilization of the equipment. Accordingly, it is desirable to produce a vegetative inoculum in a nutrient broth culture by inoculating the broth culture with an aliquot from a soil or slant culture. When a young, active vegetative inoculum has thus been secured, it is transferred aseptically to large vessels or tanks. The medium in which the vegetative inoculum is produced can be the same as, or different from, that utilized for the production of the new compound as long as it is such that a good growth of the microorganism is obtained.

The new compound of the invention, nogalamycin, is a basic substance whose elemental analysis indicates the empirical formula $C_{35}H_{47}NO_{15}$. It is soluble in methylene chloride, acetone, ethyl acetate and chloroform. Nogalamycin is relatively insoluble in water, methanol and ethanol.

In accordance with a preferred procedure for the recovery of the new compound of the invention, the whole beer is adjusted, if necessary, to a near neutral pH or below, suitably between pH 5 and 7, and filtered. A filter aid, for example, diatomite can be used. The filtrate is then extracted with a water-immiscible solvent and the new compound recovered from the solvent phase. If desired, the solvent phase can be acidified, and the new compound recovered in a protonated form. This can be accomplished by precipitating the new compound as an insoluble salt or by extracting the solvent extract with an aqueous solution of an acid which forms a water soluble salt, for example, hydrochloric acid, sulfuric acid, phosphoric acid, and acetic acid. Advantageously, the latter is accomplished by adjusting the pH to less than 7.5, preferably below pH 6. The salt is then recovered by evaporation.

If desired, the above extraction procedure can be repeated to effect a desired purification before the salt is recovered. Also, a change of water-immiscible solvent can be utilized to effect further purification. For example, methylene chloride can be utilized to wash out impurities from the aqueous solutions of the salt form, or to extract the free base from aqueous solutions of the non-protonated compound.

The new compound of the invention can also be recovered from the filtered beer by adsorption on cation exchange resins. Both the carboxylic and sulfonic acid types can be used. Suitable carboxylic acid resins include the polyacrylic acid resins obtained by the copolymerization of acrylic acid and divinylbenzene by the procedure given on page 87 of Kunin, Ion Exchange Resins, 2nd Ed. (1958), John Wiley and Sons, Inc. Carboxylic acid cation exchange resins of this type are marketed under the trade names Amberlite IRC-50 and Zeokarb 226. Suitable sulfonic acid resins include nuclear sulfonated polystyrene resins crosslinked with divinylbenzene obtained by the procedure given on page 84 of Kunin, supra. Sulfonated cation exchange resins of this type are marketed under the tradenames Dowex-50, Amberlite IR-120, Nalcite HCR, Chempro C-20, Permutit Q, and Zeokarb 225.

The protonated antibiotic is eluted from the resin with water at an acid pH, advantageously at a pH lower than the pKa of the cation exchange resin used. Satisfactory results are obtained with a pH of about 1 to 6. The excess acid in the eluate is neutralized to about pH 7.5 to 8.5 with a base, e.g., sodium hydroxide, or a strongly basic anion exchange resin, and the antibiotic is extracted with a water-immisible solvent according to the process described above. [Suitable anion exchange resins for this purpose are obtained by chloromethylating by the procedure given on pages 88 and 97 of Kunin, supra, polystyrene crosslinked, if desired, with divinylbenzene prepared by the procedure given on page 84 of Kunin, supra, and quaternizing with trimethylamine, or dimethylethanolamine by the procedure given on page 97 of Kunin, supra. Anion exchange resins of this type are marketed under the tradenames Dowex 2, Dowex 20, Amberlite IRA-400, Duolite A-102 and Permutit S-1.]

The novel compound of the invention can also be recovered from harvest beers and other aqueous solutions by adsorption on a surface active adsorbent, for example, silicates, decolorizing carbon, or decolorizing resins, and eluting the adsorbed material with a solvent. Any of the solvents mentioned above can be used. A suitable decolorizing resin is Permutit DR (U.S. Patent 2,702,263).

The new compound of the invention can be purified by successive transfers from protonated to non-protonated forms and vice versa, especially with other types of treatments intervening, as for example, solvent extractions and washings, chromatography, and fractional liquid-liquid extractions.

The new compound of the invention can also be purified by conversion of the protonated or non-protonated forms to less soluble forms, for example, by reaction with picric acid.

Salts of nogalamycin can be used for the same biological purposes as the free base or they can be converted back to the free base and then converted to other salts such as the nitrate, oxalate, hydrochloride, and sulfate.

The salts can be converted to the free base by neutralizing with an alkali or by contacting with an anionic resin, advantageously to about pH 7.5 to 8.5. Specific acid salts can be made by neutralizing the free base with the appropriate acid to below about pH 7.5, and advantageously to about pH 2 to pH 6. Suitable acids for this purpose include hydrochloric, sulfuric, phosphoric, acetic, succinic, citric, lactic, maleic, fumaric, pamoic, chloic, palmitic, mucic, camphoric, glutaric, glycolic, phthalic, tartaric, lauric, stearic, salicylic, 3-phenylsalicylic, 5-phenylsalicylic, 3-methyl glutaric, ortho-sulfobenzoic, cyclohexanesulfamic, cyclopentanepropionic, 1,2-cyclohexanedicarboxylic, 4-cyclohexenecarboxylic, octadecenylsuccinic, octenylsuccinic, methanesulfonic, benzenesulfonic, helianthic, Reinecke's, azobenzenesulfonic, octadecylsulfuric, picric, and like acids.

Nogalamycin has an $ID_{50}$ of 0.0054 mcg./ml. against KB cells in tissue culture.

The new compound of the invention, nogalamycin, has a broad spectrum of antibacterial activities. A tube dilution spectrum using broth media BHI (Brain Heart Infusion broth, Difco, Detroit, Michigan) was run with nogalamycin. Assay tubes (18 x 150 mm.) were prepared in the customary manner set out in Snell E.E., Vitamin Methods, vol. I, Academic Press, Inc., New York, 1950, page 327. Test organisms grown for 18 hrs. at 37° C. were used to inoculate the test medium at a dilution of 1–40,000. The antibacterial spectrum of nogalamycin is shown in the following Table I.

Table I.—Antibacterial spectrum of nogalamycin

| Test organism: | M.I.C.* (mcg./ml.) |
|---|---|
| Diplococcus pneumoniae | 0.1 |
| Staphylococcus aureus | 0.8 |
| Staphylococcus albus | 0.8 |
| Streptococcus fecalis | 0.4 |
| Streptococcus hemolyticus | 0.4 |
| Streptococcus viridans | 0.4 |
| Bacillus subtilis | 50 |

* M.I.C.=minimal inhibitory concentration.

The new compound of the invention, nogalamycin, is active against *Bacillus subtilis* and can be used for treating breeding places of silk worms to prevent or minimize infections caused by this organism. It can also be used to minimize or prevent odor in fish and fish crates caused by this organism. The new compound can be used as a disinfectant on various dental and medical equipment contaminated with *Staphylococcus albus* or *Staphylococcus aureus;* it can also be used as a disinfectant on washed and stacked food utensils contaminated with *Staphylococcus areus*. Nogalamycin can also be used as a rodenticide.

The following examples are illustrative of the process and products of the present invention, but are not to be construed as limiting. All percentages are by weight and all solvent mixture proportions are by volume unless otherwise noted.

Example 1

(A) *Fermentation.*—A soil stock of *Streptomyces nogalater* var. *nogalater* NRRL 3035 was used to inoculate a 500 ml. Erlenmeyer flask containing 100 ml. of seed medium consisting of the following ingredients:

| Glucose monohydrate | grams | 25 |
| Pharmamedia * | do | 25 |
| Tap water q.s. | liter | 1 |

* Pharamedia is an industrial grade of cottonseed flour produced by Traders Oil Mill Co., Fort Worth, Texas.

The seed medium presterilization pH was 7.2. The seed was grown for two days at 28° C. on a Gump rotary shaker operating at 250 r.p.m.

The seed inoculum, described above (100 ml.), was used to inoculate a 20-liter seed tank containing 15 liters of the following sterile seed medium:

| Glucose monohydrate | g./l | 10 |
| Corn steep liquor | g./l | 10 |
| Pharmamedia | g./l | 2 |
| Wilson's Peptone Liquor No. 159 * | g./l | 10 |
| Lard oil | ml./l | 2 |
| Tap water | | Balance |

* Wilson's Peptone Liquor No. 159 is a preparation of enzymatically hydrolyzed proteins from animal origin.

The presterilization pH of the seed tank medium was 7.2. The seed tank was grown for 24 hours at a temperature of 28° C., aeration rate of 10 standard liters/min., and agitated at a rate of 400 r.p.m.

The seed tank, described above, was then used to inoculate a 380-liter fermenter containing 250 liters of the following sterile medium:

| Glucose monohydrate | g./l | 20 |
| Starch | g./l | 20 |
| Yeast | g./l | 25 |
| $CaCO_3$ | g./l | 5 |
| Lard oil | ml./l | 5 |
| Tap water | | Balance |

The pH was adjusted to 6.8 with sodium hydroxide before sterilization. The culture was grown for 4 days at a temperature of 28° C., aeration rate of 100 standard liters/min., and agitated at a rate of 280 r.p.m.

(B) *Extraction.*—Whole beer (212 kg., 36 BU/gm.) from the above fermenter was filtered in a press with the aid of 10 kg. of diatomite. The filter cake was washed with 120 liters of ethyl acetate; the ethyl acetate wash was then used for the first extraction of the filtrate. The filtrate (190 l.) was extracted with 3–120 l. portions of ethyl acetate at a pH of 6.7 (harvest pH) and the extracted filtrate was discarded. The combined ethyl acetate extracts (260 l.) were extracted with 3–130 liters portions of 0.1 N hydrochloric acid. The combined hydrochloric acid extract was adjusted to pH 7 with 6.5 liters of 50 percent sodium hydroxide and the neutral solution (435 liters) was extracted with 3–220 liter portions of ethyl acetate. The extracted aqueous solution which has no activity against *B. subtilis* was discarded. The combined ethyl acetate extract (660 liters) was concentrated in vacuo to an oil. The oil was dissolved in 400 ml. of 80 percent t-butyl alcohol and the resulting solution was lyophilized to yield crude nogalamycin which was a reddish-brown solid weighing 51.5 g. and having an activity of 102 BU/mg. (the assay procedure used was a correlative assay using *Bacillus subtilis* in the disc plate agar technique. The activity is given in biounits per mg.-BU/mg.).

(C) *Purification.*—The crude nogalamycin (40 g.) described above was dissolved in a mixture of 300 ml. of 1 N hydrochloric acid and 200 ml. of ethyl acetate. After mixing well, the lower phase was separated and extracted with 2–150 ml. portions of ethyl acetate. The ethyl acetate extracts were further extracted with 2–100 ml. portions of 0.1 N hydrochloric acid. The combined aqueous extracts were filtered and the filtrate adjusted to pH 7.4 with 30 percent sodium hydroxide and extracted with 4–300 ml. portions of ethyl acetate. The ethyl acetate extracts were combined, dried over sodium sulfate and evaporated in vacuo. The residue on crystallization from 400 ml. of methanol yielded 19 g. of crystalline nogalamycin.

CHEMICAL AND PHYSICAL PROPERTIES OF NOGALAMYCIN

Crystalline nogalamycin had the following physical and chemical properties:

Melting point: 199° C.
Elemental analysis:
  C=58.35%
  H=6.49%
  N=1.97%
  O=32.83%
Empirical formula: $C_{35}H_{47}NO_{15}$ Specific optical rotation: $[\alpha]_D^{25} = +425°$ (c.,=0.11 in $CHCl_3$)

Solubility—
Soluble:
    Methylene chloride
    Acetone
    Ethyl acetate
    Chloroform
Insoluble:
    Water
    Methanol
    Ethanol Ultraviolet spectrum: The ultraviolet absorption maxima of crystalline nogalamycin as reproduced in FIG. 2 of the drawing, are
    Neutral and acidic EtOH—
        236 m$\mu$, a=65.76
        259 m$\mu$, a=31.27
        290 m$\mu$, a=11.89
    Alkaline EtOH—
        240 m$\mu$, a=58.96
        288 (sh) m$\mu$, a=10.45
        322 m$\mu$, a=6.03

Visible spectrum: The visible absorption maxima of crystalline nogalamycin is as follows:
    Neutral and acidic EtOH—480 m$\mu$, a=19.54
    Alkaline EtOH—553 m$\mu$, a=18.10

Infrared spectrum: The infrared absorption spectrum of nogalamycin suspended in mineral oil mull is reproduced in FIG. 1 of the drawing. Nogalamycin shows peaks at the following wave lengths expressed in reciprocal centimeters:

[cm.$^{-1}$]

| | | |
|---|---|---|
| 3540 | 1575 | 1105 |
| 3460 | 1250 | 1050 |
| 3400 | 1220 | 1000 |
| 1745 | 1205 | 770 |
| 1670 | 1160 | 760 |
| 1620 | 1148 | |

Molecular weight: 721.8

We claim:
1. A composition of matter assaying at least 1.4 mcg./mg. of nogalamycin, a compound which
    (a) is effective in inhibiting the growth of various gram positive and gram negative bacteria;
and in its essentially pure crystalline form
    (b) is soluble in methylene chloride, acetone, chloroform and ethyl acetate; and insoluble in water, methanol, and ethanol;
    (c) has the following elemental analysis:
        C=58.35; H, 6.49; N, 1.97; O, 32.83
    (d) has a molecular weight of 721.8;
    (e) has a characteristic ultraviolet absorption spectrum as follows:
        Neutral and acidic EtOH
            236 m$\mu$, a=65.76
            259 m$\mu$, a=31.27
            290 m$\mu$, a=11.89
        Alkaline EtOH
            240 m$\mu$, a=58.96
            288 (sh), m$\mu$, a=10.45
            322 m$\mu$, a=6.03
    and as shown in FIG. 2 of the drawing;
    (f) has an optical rotation $[\alpha]_D^{25}+425°$ (c.=0.11 in $CHCl_3$); and
    (g) has a characteristic infrared absorption spectrum as shown in FIG. 1 of the accompanying drawing.
2. A compound, nogalamycin, according to claim 1 in its essentially pure crystalline form.
3. A process which comprises cultivating *Streptomyces nogalater* var. *nogalater* in an aqueous nutrient medium under aerobic conditions until substantial activity is imparted to said medium by production of nogalamycin.
4. A process which comprises cultivating *Streptomyces nogalater* var. *nogalater* in an aqueous nutrient medium containing a source of assimilable carbohydrate and assimilable nitrogen under aerobic conditions until substantial activity is imparted to said medium by production of nogalamycin and isolating the nogalamycin so produced.
5. A process according to claim 4 in which the isolation comprises filtering the medium and then contacting the filtrate with a water-immiscible solvent for nogalamycin and recovering nogalamycin from the solvent extract.
6. A compound selected from the group consisting of nogalamycin according to claim 1 and the acid addition salts thereof.
7. A compound as defined in claim 1, nogalamycin, in its essentially pure form.

References Cited by the Examiner
UNITED STATES PATENTS
3,116,202  12/63  Dietz et al. _____ 167—65

LEWIS GOTTS, *Primary Examiner.*
JULIAN S. LEVITT, *Examiner.*